E. C. MEIER.
BOX HEADER.
APPLICATION FILED JAN. 22, 1916.

1,208,813.

Patented Dec. 19, 1916.
2 SHEETS—SHEET 1.

Witnesses
Wm. Conway
C. R. Ziegler

Inventor
Edward C. Meier,
By Joshua R. H. Potts.
his Attorney

E. C. MEIER.
BOX HEADER.
APPLICATION FILED JAN. 22, 1916.
1,208,813.
Patented Dec. 19, 1916.
2 SHEETS—SHEET 2.
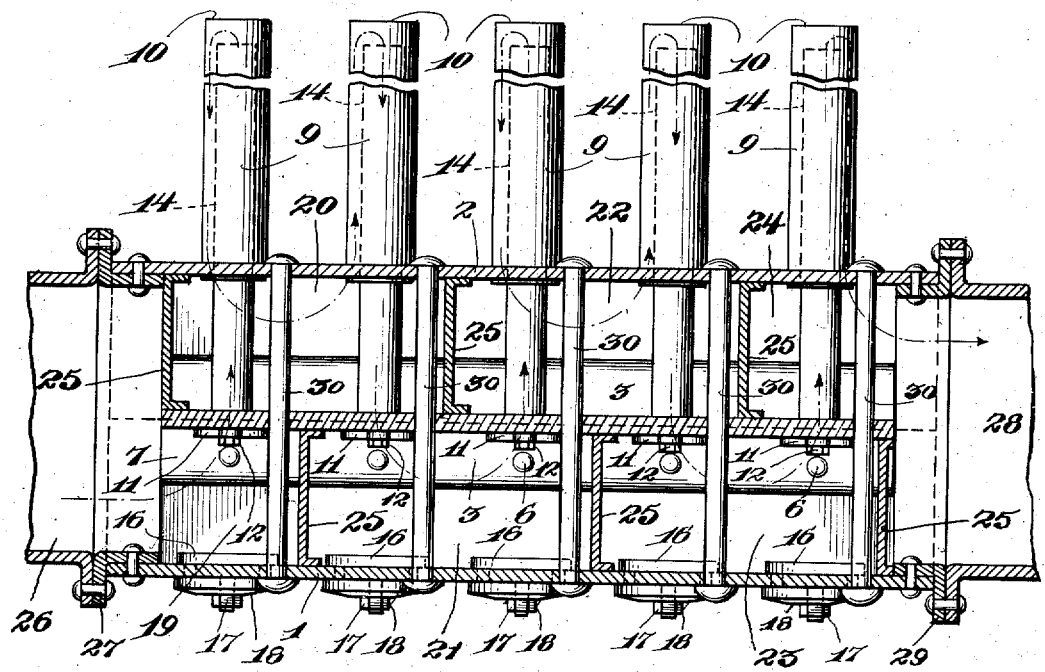
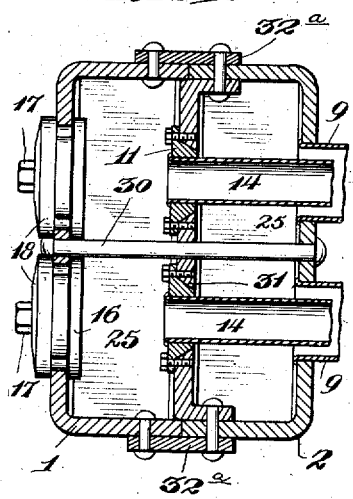
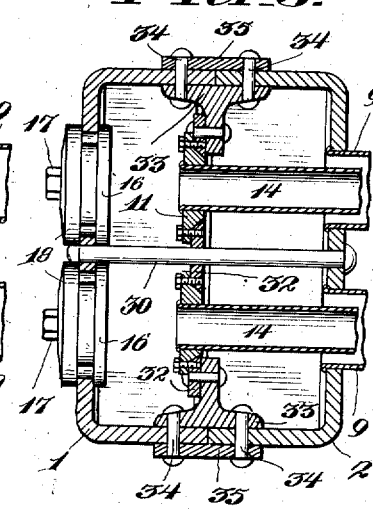
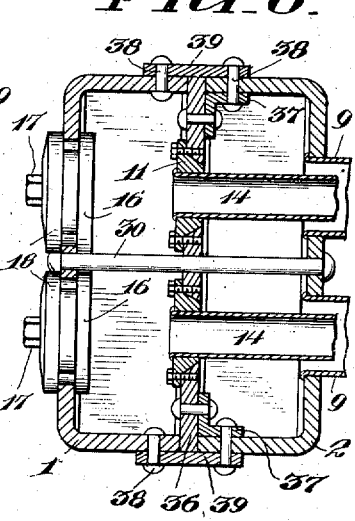
Witnesses
Wm. Conway
C. R. Ziegler.
Inventor
Edward C. Meier
By Joshua R. H. Potts.
his Attorney

UNITED STATES PATENT OFFICE.

EDWARD C. MEIER, OF PHOENIXVILLE, PENNSYLVANIA.

BOX-HEADER.

1,208,813. Specification of Letters Patent. Patented Dec. 19, 1916.

Application filed January 22, 1916. Serial No. 73,513.

*To all whom it may concern:*

Be it known that I, EDWARD C. MEIER, a citizen of the United States, residing at Phoenixville, in the county of Chester and State of Pennsylvania, have invented certain new and useful Improvements in Box-Headers, of which the following is a specification.

My invention relates to improvements in box headers, and more particularly to a header which is adapted for use as a part of a superheater or preheater, the object of the invention being to provide a header which is of maximum strength and durability, and which insures a free passage of steam therethrough.

A further object is to provide an improved combination of parts secured together in an improved manner, all of said parts coöperating in the production of a box header which most efficiently performs the functions for which it is intended.

With these and other objects in view, the invention consists in certain novel features of construction and combinations and arrangements of parts as will be more fully hereinafter described and pointed out in the claims.

Figure 1:
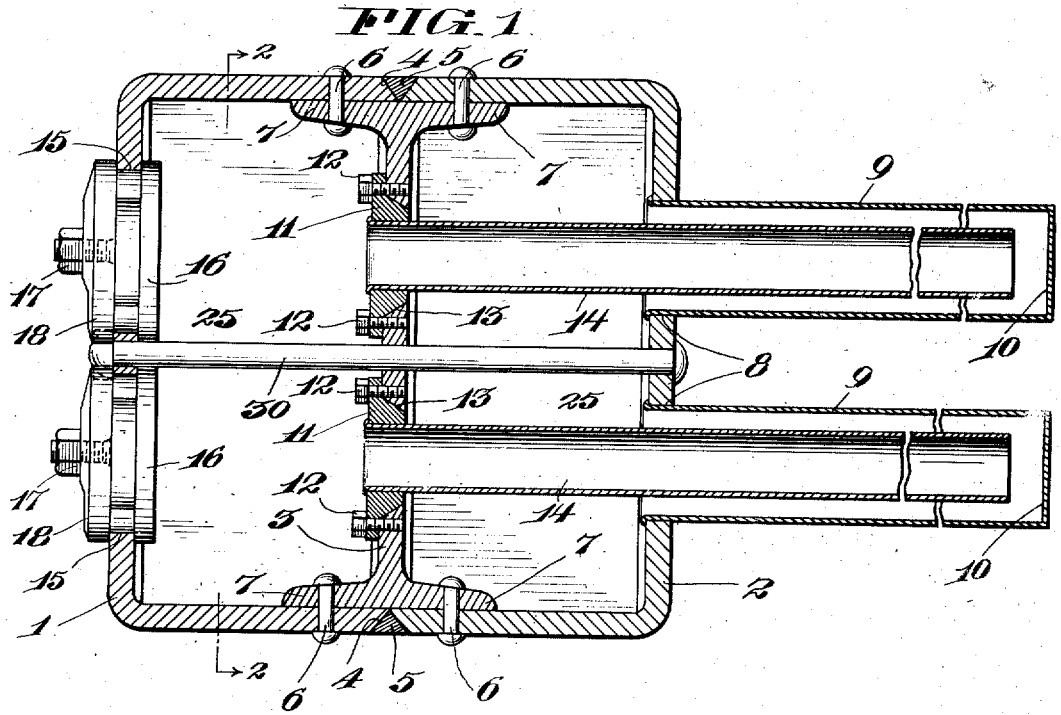
Figure 2:
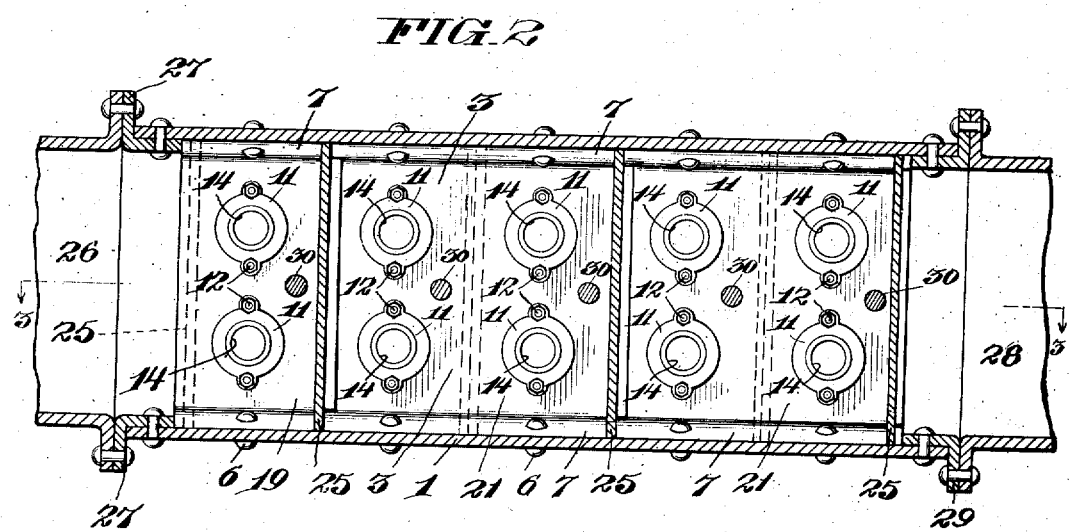

In the accompanying drawings: Figure 1 is a view in transverse section through my improved box header showing the tubes in longitudinal section. Fig. 2 is a view in vertical longitudinal section on the line 2—2 of Fig. 1. Fig. 3 is a view in horizontal longitudinal section on the line 3—3 of Fig. 2, and Figs. 4, 5, and 6, are views in transverse section similar to Fig. 1, illustrating modifications.

1 and 2 represent the two members which form the box header, and they are each of general channel shape, with their edges projecting toward each other, and secured to an I-beam 3, which extends longitudinally of the box header and forms a longitudinal partition therein. The extreme edges of the members 1 and 2, where they project over the I-beam 3, are beveled forming a trough 4, into which welding material 5 is located. I do not rely solely upon this welding material as a securing means, as I provide rivets 6 which extend through the members 1 and 2, and through the flanges 7 of the I-beam, but the welding material operates to calk the header as well as strengthen the juncture of the two members. To further strengthen the header, I provide a series of stay bolts 30 which extend transversely of the header, through both members 1 and 2, and through the I-beam 3, so that these stay bolts give to the header a maximum strength to withstand internal pressure. The member 2 is provided with openings 8, in which the open ends of tubes 9 are secured, the outer or free ends of said tubes 9 being closed as shown at 10. Removable plates 11 are secured by screws 12, in openings 13 in I-beam 3, and these plates 11 support tubes 14 which are open at both ends, the tubes 14 are of appreciably less diameter than tubes 9, and project into the tubes 9 as shown clearly in Fig. 1. Member 1 of the box header, is provided with hand holes 15 corresponding in shape to the shape of plates 11, and hand hole plates 16 are secured in said hand holes by means of a nut 17 and yoke 18.

As shown clearly in Figs. 1 and 2, I preferably locate the tubes in pairs, although of course I am not limited to any particular number, and I subdivide the box header into a plurality of chambers 19, 20, 21, 22, 23, and 24 by means of transverse partitions 25, which connect the I-beam 3 with the members 1 and 2. These partitions have a staggered relationship so that the steam travels in and out of the respective tubes and chambers in regular succession, so as to secure the proper speed of the steam from the superheater and at the same time secure the highest efficiency in superheating the steam.

I have indicated by arrows, on Fig. 3, the direction of the steam passage through the superheater, and in this view, I have also shown an inlet pipe 26 secured to a flanged collar 27, the latter secured in one end of the superheater, while an outlet pipe 28 is secured to a flanged collar 29 secured in the other end of the superheater.

In the modification illustrated in Fig. 4, I provide a channel plate 31 in lieu of the I-beam 3 of the preferred form, and also provide a butt strap 32ª at the edges of the members 1 and 2.

In Fig. 5, I illustrate as a longitudinal partition, a plate 32 which is secured at its edges to T-bars 33, and the latter secured to members 1 and 2 by means of rivets 34 which project through butt straps 35 on the outside of the header.

In Fig. 6, a straight partition plate 36 is employed which projects between the edges of members 1 and 2, and is secured by angle bars 37 to the member 2. Rivets 38 are employed to secure the angle bars 37 to plate 36, and to members 1 and 2, and also are utilized to secure butt straps 39 to the outer face of the header.

In the modifications shown in Figs. 4, 5, and 6, the parts, except as specifically referred to, are identical with the preferred form, and I have used therefore, like reference numerals to indicate like parts in these figures.

Various other slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A box header comprising two members forming a casing and having their edges projecting toward each other, a member forming a longitudinal partition adjacent the parting line of said two members, said member having flanged ends bridging the parting between the edges and being secured to the casing, stay bolts projecting through both of said first members and through the partition, said stay bolts having their opposite heads respectively engaging the outer surface of said members and serving to bind them together, tubes secured to one of said members and having closed ends, open ended tubes of smaller diameter than the first-mentioned tubes and secured in the partition and projecting into the first-mentioned tubes, substantially as described.

2. A box header comprising two members having their edges projecting toward each other, an I-beam forming a longitudinal partition adjacent the parting line of said two members, said I-beam having its opposite flanged ends secured to both of said members and bridging the parting between said edges, stay bolts projecting through both members and through the partition, said stay bolts having their opposite heads respectively engaging the outer surfaces of said members and serving to bind them together, tubes secured to one of said members and having closed ends, open ended tubes of smaller diameter than the first-mentioned tubes and secured in the partition and projecting into the first-mentioned tubes, and welding material interposed between said edges of the members, substantially as described.

3. A box header of the character described, comprising two members forming a casing and having their edges projecting toward each other, a partition member extending longitudinally within said casing and having flanged ends bridging the parting between said edges and being secured to the casing, means forming transverse partitions within said casing and connecting the longitudinal partition with the inner surfaces of said first members, stay bolts extending through both of said first members and through the partition member, the heads of said bolts being in engagement with the outer surfaces of said first members and serving to bind them together, tubes secured to one of said first members and having closed outer ends, smaller open ended tubes secured in the longitudinal partition and projecting into the first-mentioned tubes, and flanged collars secured to the ends of the header, one of said collars adapted to be secured to an inlet pipe and the other to an outlet pipe, substantially as described.

4. A box header of the character described, comprising two members having their edges projecting toward each other, a longitudinal partition located inside the header, and having flanged portions at opposite ends, each of said flanged portions being secured to both members, the edges of both of said members beveled forming V-shaped troughs, welding material in said troughs, and tubes having ends communicating with space between opposite surfaces of the partition and oppositely disposed surfaces of said members, the other ends of said tubes being in communication, and means providing inlet and outlet passages, said passages communicating with space adjacent opposite surfaces of said partition, substantially as described.

5. A box header of the character described, comprising two channel shaped members having their edges projecting toward each other, welding material between the edges of the members, an I-beam extending longitudinally of the box header, and secured to both of said members, and stay bolts projecting through both of said members and through the I-beam, substantially as described.

In testimony whereof I have signed my name to this specification in the presence of two subscribing witnesses.

EDWARD C. MEIER.

Witnesses:
 EUGENE V. HEILMAN,
 M. EDWIN J. HEILMAN.